United States Patent [19]

Ebisawa et al.

[11] Patent Number: 5,056,923
[45] Date of Patent: Oct. 15, 1991

[54] OPTICAL THICKNESS MEASURING APPARATUS

[75] Inventors: Ryoji Ebisawa; Toshihiro Matsushita, both of Kanagawa, Japan

[73] Assignee: Fuji Photo Film Co., Ltd., Kanagawa, Japan

[21] Appl. No.: 655,020

[22] Filed: Feb. 14, 1991

Related U.S. Application Data

[63] Continuation-in-part of Ser. No. 371,854, Jun. 27, 1989, abandoned.

[30] Foreign Application Priority Data

Jun. 29, 1988 [JP] Japan .................................. 63-162149

[51] Int. Cl.⁵ .............................................. G01B 11/06
[52] U.S. Cl. ...................................... 356/382; 356/405
[58] Field of Search ........................ 356/381, 382, 405

[56] References Cited

U.S. PATENT DOCUMENTS 4,785,336  11/1988  McComb et al. ................... 356/382

FOREIGN PATENT DOCUMENTS 52806  3/1982  Japan .................................. 356/381
87307  5/1984  Japan .................................. 356/382

Primary Examiner—F. L. Evans
Attorney, Agent, or Firm—Sughrue, Mion, Zinn Macpeak & Seas

[57] ABSTRACT

An optical thickness measuring apparatus comprises a light source, a spectral device which separates light produced by the light source into its spectral components, and a photodetector for detecting the light which has been separated by the spectral device into its spectral components and which has been scatter-reflected by a material being subjected to thickness measurement, said photodetector receiving only scatter-reflected light. An operation processing device calculates either one of variables $a^*$ or $b^*$ of an $L^*a^*b^*$ colorimetric system or either one of variable $u^*$ or $v^*$ of an $L^*u^*v^*$ colorimetric system on the basis of information about the light which has been scatter-reflected by the material. The information is received from the photodetector. A thickness calculating device calculates the thickness of the material from the value of the variable calculated by the operation processing device.

2 Claims, 2 Drawing Sheets

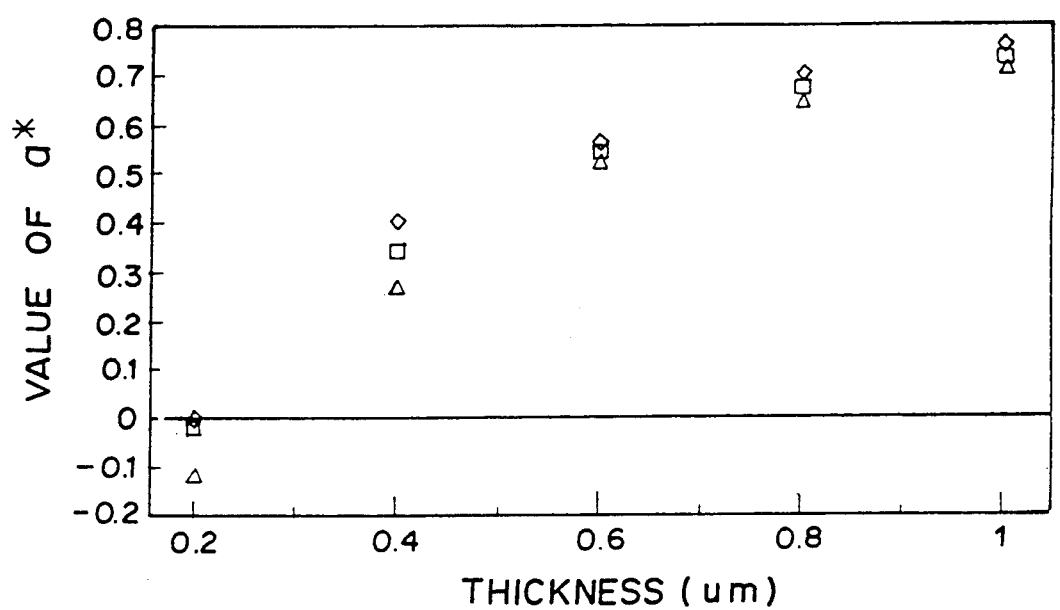
F I G. 2

OPTICAL THICKNESS MEASURING APPARATUS

This application is a continuation-in-part application of Application Ser. No. 371,854 filed June 27, 1989 now abandoned.

BACKGROUND OF THE INVENTION

1. Field of the Invention

This invention relates to an apparatus for measuring the thickness of a material such as a film which has been coated on a surface of a film-like base.

2. Description of the Prior Art

In the manufacturing processes for coating a film on a film-like base, it is necessary to inspect the thickness of the coating of film which has been applied to the base. As apparatuses for measuring the thickness of a material such as a coating of film, an apparatus wherein light is irradiated to the material and the amount of light reflected from the material is measured, an apparatus wherein a plurality of light beams having different wavelengths are irradiated to the material and the difference in reflectivity between the light beams is measured, and the like have heretofore been used.

However, with the conventional techniques described above, the measurement sensitivity is not substantially high and the measured values fluctuate largely when the conventional techniques are used in processes wherein a high accuracy is required in the measurement of the thickness of a coating of film. Also, a very large error in measurement may arise, depending on the kind of substance used to form the film coating. Therefore, the conventional techniques are not applicable to many kinds of film coatings.

In order to eliminate the aforesaid problems in the conventional techniques, a novel method for measuring the thickness of a material has been proposed in Japanese Unexamined Patent Publication No. 57(1982)-52806. The proposed method comprises the steps of separating light emitted by the material into its spectral components, carrying out colorimetry in order to find chromaticity coordinates, calculating the gradient of a straight line which connects a coordinate point having the chromaticity coordinates on the chromaticity diagram to a standard coordinate point having standard coordinates, and finding the thickness of the material on the basis of the value of the gradient.

However, with the method wherein chromaticity coordinates are found in order to find the thickness of the material, because the gradient of the straight line which connects the coordinate point having the chromaticity coordinates to the standard coordinate point is calculated, it is necessary to calculate two or more variables in order to specify a single coordinate point. For example, in order to specify the coordinates of a measurement point in an X-Y coordinate system, it is necessary to calculate the values of variables X and Y representing the coordinates. Therefore, it takes a long time to find the thickness of the material, and a memory having a large capacity is required to store information tables.

Further, there has been known an optical thickness measuring apparatus in which light which has been separated into its spectral components and has been reflected by a material is received by a photodetector, and variable $b^*$ of CIE $L^*a^*b^*$ colorimetric system or the reflectivity pattern for each wavelength is calculated on the basis of information about the light detected by the photodetector, and the thickness of the material is calculated from the value of variable $b^*$ calculated or the reflectivity pattern calculated. {See U.S. Pat. No. 4,785,336 (McComb et al), Japanese Patent Application No. 59(1984)-87307 (Yumiba), and the like.}

However, in these conventional techniques, since an integrating sphere is used to collect the light, the scatter-reflected light and the regular-reflected light are detected simultaneously. In magnetic tape or the like which has a high surface gloss, the intensity of the regular-reflected light on its surface is too high to be influenced by the thickness of the layer.

Accordingly, it is very difficult for the system of those conventional techniques mentioned above to measure, in high degree accuracy, the thickness of the layer of magnetic tapes or the like.

SUMMARY OF THE INVENTION

The primary object of the present invention is to provide an optical thickness measuring apparatus wherein the thickness of a material is quickly calculated on the basis of chromaticity coordinates.

Another object of the present invention is to provide an optical thickness measuring apparatus wherein the capacity of a memory necessary for storing information tables is decreased.

Still another object of the present invention is to provide an optical thickness measuring apparatus wherein the thickness of a material which has a high surface gloss is calculated in high degree accuracy.

The present invention provides an optical thickness measuring apparatus which comprises:

i) a light source,
ii) a spectral means which separates light produced by said light source into its spectral components,
iii) a photo detecting means for detecting the light which has been separated by said spectral means into the spectral components and which has been scatter reflected by a material being subjected to thickness measurement, said photo detecting means receiving only scatter-reflected light,
iv) an operation processing means which calculates either one of variables $a^*$ or $b^*$ of an $L^*a^*b^*$ colorimetric system (CIE Lab colorimetric system) or either one of variables $u^*$ or $v^*$ of an $L^*u^*v^*$ colorimetric system (CIE Luv colorimetric system) on the basis of information about the light which has been scatter-reflected by said material, said information being received from said photo detecting means, and
v) a thickness calculating means which calculates the thickness of said material from the value of the variable calculated by said operation processing means.

The spectral means may be located between the light source and the material to be subjected to thickness measurement, or between the material and the photo detecting means.

With the optical thickness measuring apparatus in accordance with the present invention, the variable $a^*$ or the variable $b^*$ of the $L^*a^*b^*$ colorimetric system or the variable $u^*$ or the variable $v^*$ of the $L^*u^*v^*$ colorimetric system is calculated by the operation processing means on the basis of information about the light which has been separated into its spectral components and which has been scatter-reflected by the material. The thickness of the material is calculated from the calculated variable. Because only a single variable is calculated during the calculation of the thickness of the material, the thickness can be calculated more quickly than with the conventional technique wherein two or more variables are calculated. Also, the capacity of a memory necessary for storing information tables can be decreased.

The apparatus of the present invention uses scatter-reflection and is therefore especially useful for measuring the thickness of the top layer of high surface gloss film like magnetic tapes.

Since the magnetic tapes have a high surface gloss, their regular reflectance is quite high. However, their scatter reflectance is low. The change in the thickness of the top layer influences the scatter-reflected light much greater than the regular-reflected light.

BRIEF DESCRIPTION OF THE DRAWINGS

FIG. 2 is a graph showing how to create an information table which is to be stored in a memory incorporated in a thickness calculating means in the embodiment of FIG. 1.

DESCRIPTION OF THE PREFERRED EMBODIMENTS

Figure 1:
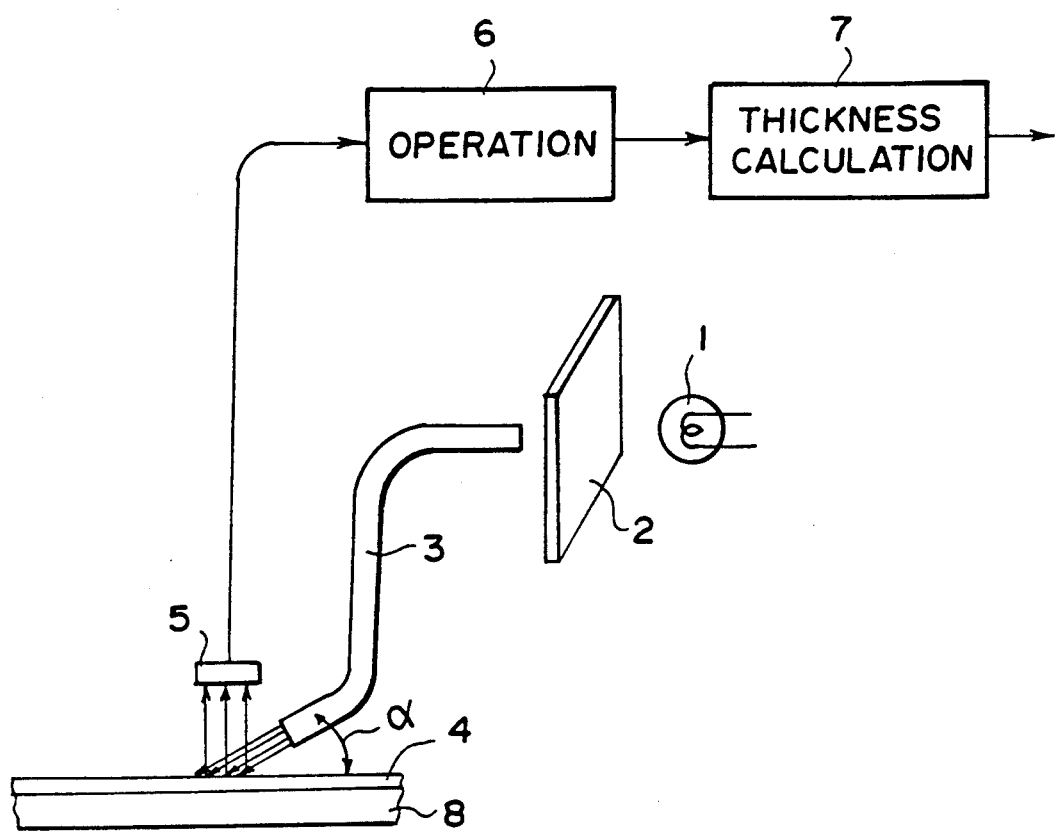
FIG. 1 is a schematic view showing an embodiment of the optical thickness measuring apparatus in accordance with the present invention.

The present invention will hereinbelow be described in further detail with reference to the accompanying drawings.

With reference to FIG. 1, light produced by a halogen lamp 1 is separated by a spectral filter 2 into its spectral components, and is then guided through an optical fiber 3 to a surface of a material 4, the thickness of which is to be measured. The light irradiated to the surface of the material 4 which has a high surface gloss such as coating of magnetic tape, and scatter-reflected thereby is detected by a photodiode 5. Based on information about the scatter-reflected light detected by the photodiode 5, an operation processing means 6 calculates a variable $a^*$ of the $L^*a^*b^*$ colorimetric system. Then, a thickness calculating means 7 calculates the thickness of the material 4 on the basis of the value of the variable $a^*$.

The halogen lamp 1 is of the 12 V, 100 W type, and is provided with a color temperature converting filter and a heat absorbing filter. The spectral filter 2 is an automatic switching type interference filter.

A forward edge of the optical fiber 3 is positioned so that the angle of incidence $\alpha$ of the light emanating from the forward edge of the optical fiber 3 upon the material 4 is 45°. The light emanating from the optical fiber 3 has been substantially collimated.

The photodiode 5 is positioned right above the incident point at which the light irradiated to the surface of the material 4 enters the material 4. The photodiode 5 is disposed so that its light receiving face is positioned substantially in parallel to the surface of the material 4. Further, the light receiving face of the photodiode 5 has an area which is equivalent to or smaller than the area of the material 4 over which the light is irradiated. The light receiving face is disposed at distance d from the material 4 which is not smaller than r·tanα, wherein r represents the longer diameter of the area of the material 4 over which the light is irradiated, that is, the length of the line alon which the plane which is perpendicular to the surface of the material 4 and includes the optical axis of the light irradiated to the material 4 intersects the are of the material 4 over which is light is irradiated.

In the apparatus of this embodiment, by positioning the material 4, the light irradiated to the material 4 and the photodiode 5 in the manner described above, the photodiode 5 is caused to receive only the scatter-reflected part of the light irradiated to the material 4. That is, in the case of the material like a magnetic tape which has a high surface gloss, the regular-reflected light is much more than the scatter-reflected light. The regular-reflected light is hardly affected by the surface condition. Accordingly, it is difficult to measure the thickness of a material with high accuracy by measuring the regular-reflected light. Therefore, in this embodiment, only the scatter-reflected light which is ready to be affected by the surface condition is permitted to enter the photodiode 5 while the regular-reflected light is prevented from entering the same.

The photodiode 5 is constituted of a silicon photodiode and should preferably be a quick response, low dark current type for receiving only scatter-reflected light.

The operation processing means 6 is constituted of a simple computer system having a CPU (a microcomputer system or a personal computer system), and is provided with an operation program for calculating the variable $a^*$ of th $L^*a^*b^*$ colorimetric system on the basis of the information received from the photodiode 5. In accordance with the substance which constitutes the material 4 or the like, the operation program may be designed to calculate the variable $b^*$ of the $L^*a^*b^*$ colorimetric system or to calculate both variables $a^*$ and $b^*$. Alternatively, the operation program may be designed to calculate the variable $u^*$ and/or the variable $v^*$ of the $L^*u^*v^*$ colorimetric system.

The thickness calculating means 7 is constituted of a microcomputer system having a CPU and a memory capable of storing an information table. On the basis of a signal representing the value of the variable $a^*$, which signal is received from the operation processing means 6, the thickness calculating means 7 finds a thickness value corresponding to the value of the variable $a^*$ in the information table. The information table is created from information which has been obtained in advance. How to create the information table will be described later. In cases where the signal received from the operation processing means 6 represents the variable $b^*$, $u^*$ or $v^*$, the information table is created for said variable instead of the variable $a^*$. Alternatively, the thickness calculating means 7 may be constituted of a computer system other than a microcomputer system. For example, the thickness calculating means 7 may be constituted of a personal computer system or the like. Also, a single computer system may be utilized for both the operation processing means 6 and the thickness calculating means 7.

The halogen lamp 1, the spectral filter 2, the optical fiber 3, the photodiode 5 and the operation processing means 6 may be replaced by a spectrocolorimeter which is provided with these means.

The material 4 is a film coating which contains a light metal and which has been applied onto an opaque base 8. However, the optical thickness measuring apparatus in accordance with the present invention is also applicable to the measurement of the thicknesses of films constituted of various other substances.

How to create the information table will be described hereinbelow. First, measuring operations carried out with the aforesaid optical thickness measuring apparatus are repeated 10 times for each of a set of samples having thicknesses of 0.2-, 0.4-, 0.6-, 0.8- and 1.0-μm.

The values of the variable a* generated by the operation processing means 6 during the measuring operations are detected. Thereafter, the mean value of the values of the variable a* is calculated for each sample. The table shown below lists the results thus obtained. The table also shows the standard deviation, the maximum value, and the minimum value for each sample.

| Thickness (μm) | 0.2 | 0.4 | 0.6 | 0.8 | 1.0 |
|---|---|---|---|---|---|
| Value of a* | −0.01 | 0.39 | 0.56 | 0.70 | 0.74 |
|  | −0.01 | 0.33 | 0.55 | 0.67 | 0.75 |
|  | −0.12 | 0.36 | 0.55 | 0.69 | 0.74 |
|  | −0.01 | 0.35 | 0.53 | 0.65 | 0.72 |
|  | −0.02 | 0.27 | 0.55 | 0.64 | 0.71 |
|  | 0.00 | 0.33 | 0.52 | 0.68 | 0.72 |
|  | −0.01 | 0.32 | 0.52 | 0.67 | 0.76 |
|  | 0.00 | 0.37 | 0.54 | 0.68 | 0.74 |
|  | −0.02 | 0.40 | 0.54 | 0.66 | 0.72 |
|  | −0.03 | 0.27 | 0.55 | 0.68 | 0.74 |
| Mean | −0.023 | 0.339 | 0.541 | 0.672 | 0.734 |
| Standard dev. | 0.0353 | 0.0446 | 0.0137 | 0.0181 | 0.0158 |
| Max. | 0.00 | 0.40 | 0.56 | 0.70 | 0.76 |
| Min. | −0.12 | 0.27 | 0.52 | 0.64 | 0.71 |
| Found | 0.185 | 0.351 | 0.517 | 0.683 | 0.849 |

FIG. 2 shows a graph of the mean value, the maximum value and the minimum value for each sample. In FIG. 2, the □ mark denotes the mean value, the mark denotes the maximum value, and the Δ mark denotes the minimum value. The value of the variable a* which corresponds to the middle thickness between the thicknesses of the respective samples is found with an interpolation process from the points on the graph. The information table is created from a plurality of values thus found. Alternatively, the information table may be created from values found through regression analysis. The relationship between the thickness and the variable a*, which relationship is found through regression analysis, is expressed as $y = 0.83x + 0.019$ wherein x denotes the thickness (μm), and y denotes the value of the variable a*. The values of the variable a* found through regression analysis are listed in the column for the values which were found.

In the aforesaid embodiment, the spectral filter 2 is positioned between the halogen lamp 1 and the material 4. However, thickness values can be calculated in the same manner as that described above if the spectral filter 2 is positioned between the material 4 and the photodiode 5. In order to obtain a high S/N ratio, the spectral filter 2 should preferably be positioned so that light which has already been separated into its spectral components is irradiated on the material 4.

The optical thickness measuring apparatus in accordance with the present invention can be embodied in various other manners. For example, a diffraction grating or a spectral prism may be used a the spectral means instead of the spectral filter 2.

We claim:

1. An optical thickness measuring apparatus which comprises:
   i) a light source,
   ii) a spectral means which separates light produced by said light source into its spectral components,
   iii) a photo detecting means for detecting the light which has been separated by said spectral means into its spectral components and which has been scatter-reflected by a material being subjected to thickness measurement, said photo detecting means receiving only scatter-reflected light,
   iv) an operation processing means which calculates either one of variables a* or b* of an L*a*b* colorimetric system or either one of variables u* or v* of an L*u*v* colorimetric system on the basis of information about the light which has been scatter-reflected by said material, said information being received from said photo detecting means, and
   v) a thickness calculating means which calculates the thickness of said material from the value of the variable calculated by said operation processing means.

2. An optical thickness measuring apparatus which comprises:
   i) a light source which irradiates light to a material, the thickness of which is to be measured,
   ii) a spectral means for separating the light, which has been scatter-reflected by said material, into its spectral components,
   iii) a photo detecting means for detecting the light which has been scatter-reflected by said material, and which has been separated by said spectral means into the spectral components, said photo detecting means receiving only scatter-reflected light.
   iv) an operation processing means which calculates either one of variables a* or b* of an L*a*b* colorimetric system or either one of variables u* or v* of an L*u*v* colorimetric system on the basis of information about the light which has been scatter-reflected by said material, said information being received from said photo detecting means, and
   v) a thickness calculating means which calculates the thickness of said material from the value of the variable calculated by said operation processing means.

* * * * *